United States Patent [19]

Airhart

[11] Patent Number: 5,000,285
[45] Date of Patent: Mar. 19, 1991

[54] APPARATUS FOR IMPARTING SEISMIC SIGNALS INTO THE EARTH

[75] Inventor: Tom P. Airhart, Plano, Tex.

[73] Assignee: Atlantic Richfield Company, Los Angeles, Calif.

[21] Appl. No.: 486,113

[22] Filed: Feb. 28, 1990

[51] Int. Cl.$^5$ .............................................. G01V 1/04
[52] U.S. Cl. .................................. 181/113; 181/114; 181/121; 367/189
[58] Field of Search ................ 367/189, 190; 181/110, 181/113, 114, 119, 120, 121, 401, 402

[56] References Cited

U.S. PATENT DOCUMENTS

| | | | |
|---|---|---|---|
| 3,482,646 | 12/1969 | Brown et al. | 181/120 |
| 4,284,164 | 8/1981 | Airhart | 181/117 |
| 4,284,165 | 8/1981 | Airhart et al. | 181/119 |
| 4,402,381 | 9/1983 | Airhart | 181/114 |
| 4,660,674 | 4/1987 | Airhart | 181/113 |
| 4,662,473 | 5/1987 | Betz | 181/114 |
| 4,702,344 | 10/1987 | Airhart | 181/121 |
| 4,719,607 | 1/1988 | Airhart | 367/189 |
| 4,721,181 | 1/1988 | Airhart et al. | 181/114 |
| 4,799,572 | 1/1989 | Airhart | 181/114 |

Primary Examiner—Charles T. Jordan
Assistant Examiner—J. Woodrow Eldred
Attorney, Agent, or Firm—Vinson & Elkins

[57] ABSTRACT

Seismic signal generating apparatus of the impact type that includes a signal generator having an impact mass therein, a base plate or coupling member that is engaged by the impact mass to generate the signal, a housing attached to the generator that encircles the impact mass and extends toward the base plate, and means for excluding water from within the housing so that the impact mass travels only through gas prior to engaging the anvil. The apparatus also includes control means for positioning the generator angularly and azimuthally.

25 Claims, 4 Drawing Sheets

APPARATUS FOR IMPARTING SEISMIC SIGNALS INTO THE EARTH

TECHNICAL FIELD OF THE INVENTION

This invention relates generally to apparatus for imparting seismic signals into the earth. More particularly, but not by way of limitation, this invention relates to apparatus for imparting seismic signals into the earth underwater, such as on a sea bottom, lake bottom, or the like. In another aspect, this invention relates to an apparatus for imparting seismic signals into the earth utilizing a housing for reducing the sound level during operation of the apparatus as well as excluding dust and the like therefrom.

BACKGROUND OF THE INVENTION

Impact type seismic generators have been manufactured for a number of years and successfully used for imparting seismic signals into the earth. Most such apparatus have been designed for use in an air environment. Examples of such apparatus are shown in U.S. Pat. No. 4,660,674, issued Apr. 28, 1987 to Tom P. Airhart; U.S. Pat. No. 4,402,381, issued Sept. 6, 1983 to Tom P. Airhart; U.S. Pat. No. 4,721,181, issued Jan. 26, 1988 to Tom P. Airhart et al.; and U.S. Pat. No. 4,702,344, issued Oct. 27, 1987 to Tom P. Airhart. In each of the foregoing, the impact mass travels through whatever environment the seismic generating apparatus is located.

U.S. Pat. No. 4,284,164, issued Aug. 18, 1981 to Tom P. Airhart and U.S. Pat. No. 4,284,165, issued Aug. 18, 1981 to Tom P. Airhart et al. each disclosed impact type seismic generating apparatus wherein a housing extends around the impact mass which is located in the generating apparatus, to a base plate or coupling that is utilized to transfer the impact force into the soil. In such apparatus, perforations are provided that extend through the housing and thus, if the generator were used in an underwater environment, the housing would fill with water. The water would impede the movement of the impact mass toward its engagement with the base plate. It will be further noted, that such apparatus cannot be positioned at an angle. Thus, and even if the perforations were eliminated, the apparatus would be capable of generating only compressional seismic waves.

U.S. Pat. No. 4,799,572, issued Jan. 24, 1989 to Tom P. Airhart describes an amphibious seismic source wherein the generator, lifting mechanism and all associated parts are contained within a flexible housing that is connected to the periphery of the base plate. The housing prevents water from impeding the impact mass during the generation of seismic signals.

An object of this invention is to provide apparatus for imparting seismic signals into the earth of the impact type that includes a housing encompassing a portion of the seismic generator and extending toward the coupling. Gas pressure within the housing evicts waters therefrom and prevents the entrance of water into the apparatus when used in an underwater environment. The housing aids in confining noise produced by the apparatus when used in an atmospheric environment.

SUMMARY OF THE INVENTION

This invention then provides impact type apparatus for imparting seismic signals into the earth comprising: a seismic generator for generating seismic signals; a base plate or coupling in engagement with the earth and engageable with the generator for transferring the signals from the generator into the earth; and a hollow housing that encompasses at least a portion of the generator for preventing the entrance of water into the apparatus when used in an underwater environment and for confining noise produced by the apparatus when used in an atmospheric environment.

BRIEF DESCRIPTION OF THE DRAWING

The foregoing and additional objects and advantages of the invention will become more apparent when the following detailed description is read in conjunction with the accompanying drawing, wherein like reference characters denote like parts in all views and wherein.

DETAILED DESCRIPTION OF THE PREFERRED EMBODIMENT

Figure 1:
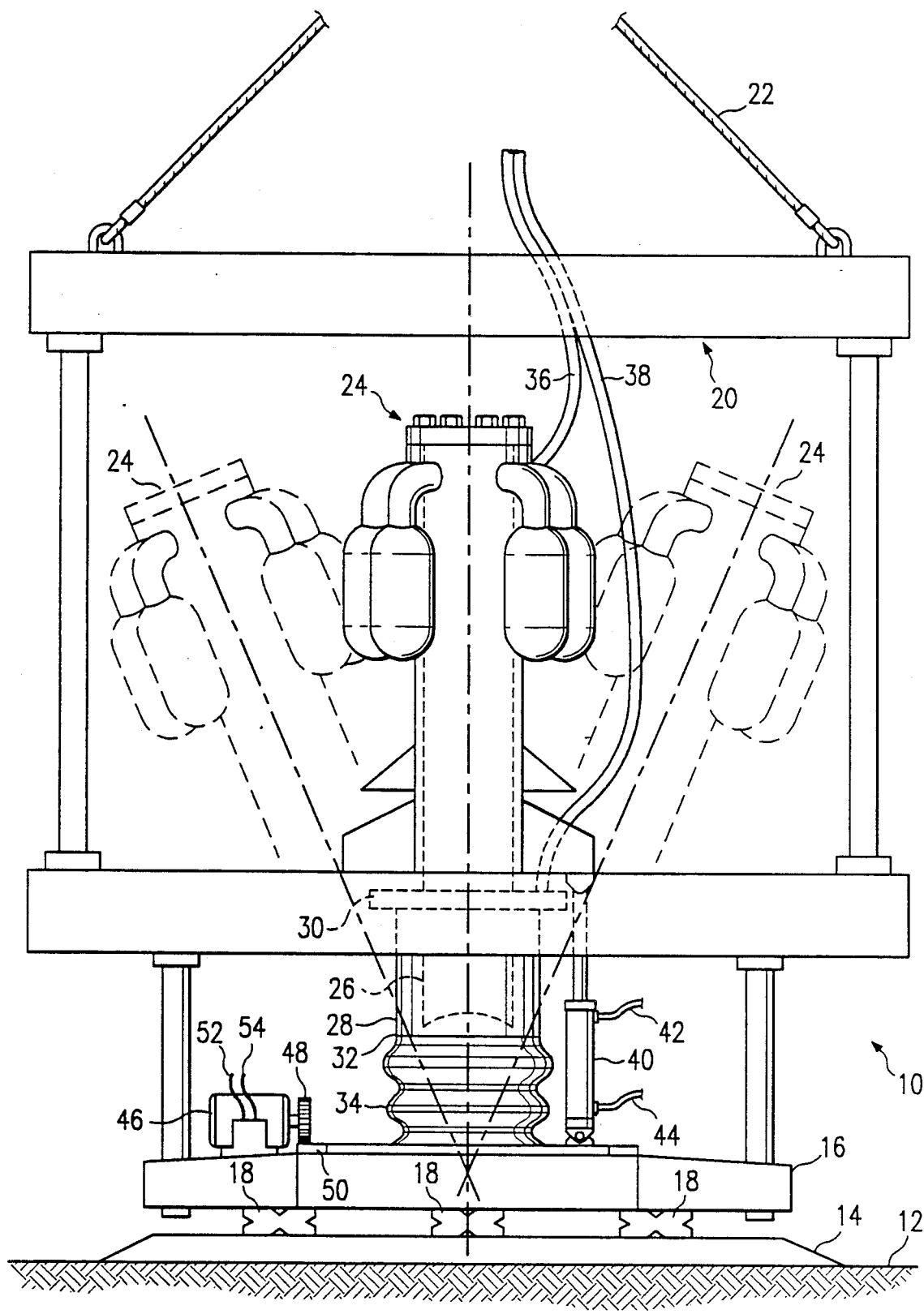
FIG. 1 is an elevational view, somewhat schematic, illustrating a seismic signal generating apparatus that is constructed in accordance with the invention.

Referring to the drawing and to FIG. 1 in particular, shown therein and generally designated by the reference character 10 is seismic generating apparatus located in engagement with a portion of the earth's surface 12. The surface 12 may be in an atmospheric environment but, most likely would be in a subsurface environment such as of the bottom of the ocean or at the bottom of a lake. The apparatus 10 includes a base plate or coupling member 14 that is in intimate engagement with the surface 12. The base plate 14 is resiliently coupled to a lift frame 16 by a plurality of shock absorbing members 18.

The lift frame 16 is coupled to an apparatus frame which is generally designated by the reference character 20. The apparatus frame 20 is connected by cables 22 with appropriate lifting apparatus (not shown) to raise and lower the apparatus 10 off of and onto the surface 12.

The apparatus 10 also includes a seismic generator that is generally designated by the reference character 24. The generator 24 includes an impact mass 26 which is driven by propulsion means that is well known in the art into engagement with a base plate 14. The impact mass 26 is located for reciprocation within a housing 28 which has an upper end 30 connected to the generator 24. A lower end 32 of the housing 26 is connected by means of a flexible, annular connector member 34 with the lift frame 16.

A second flexible annular connector (see FIGS. 2 and 3) 35 extends between the lift frame 16 and the base plate 14. The member 35 is attached to the lift frame 16 and slidingly and sealingly engages the base plate 14.

In the preferred form of the generator 24, the propulsion force is provided by air under pressure which is delivered through appropriate conduits 36. An air pressure line 38 is also provided, which extends down and connects into the upper end 30 of the housing 28, providing for the pressurization of the interior of the housing 28. As indicated in dash lines, the generator 24 may also be positioned at desired angles within the apparatus frame 20. Such angular positioning is accomplished by means of a double-acting cylinder 40 which has one end mounted on the lift frame 16 and the opposite end connected with the generator 24. Pressurized fluid is provided to the cylinder 40 through conduits 42 and 44.

The generator 24 may also be rotated within the frame 20 and such rotation is accomplished by a motor 46 that is mounted onto the frame 16. The motor 46 is provided with a drive gear 48 that is in mesh with a ring gear 50 that is mounted on the lift frame 16. Power to operate the motor 46 is also provided through leads 52 and 54. Such leads 52 and 54 may be either electrical conductors or conduits for providing pressurized pneumatic or hydraulic fluids.

Figure 2:
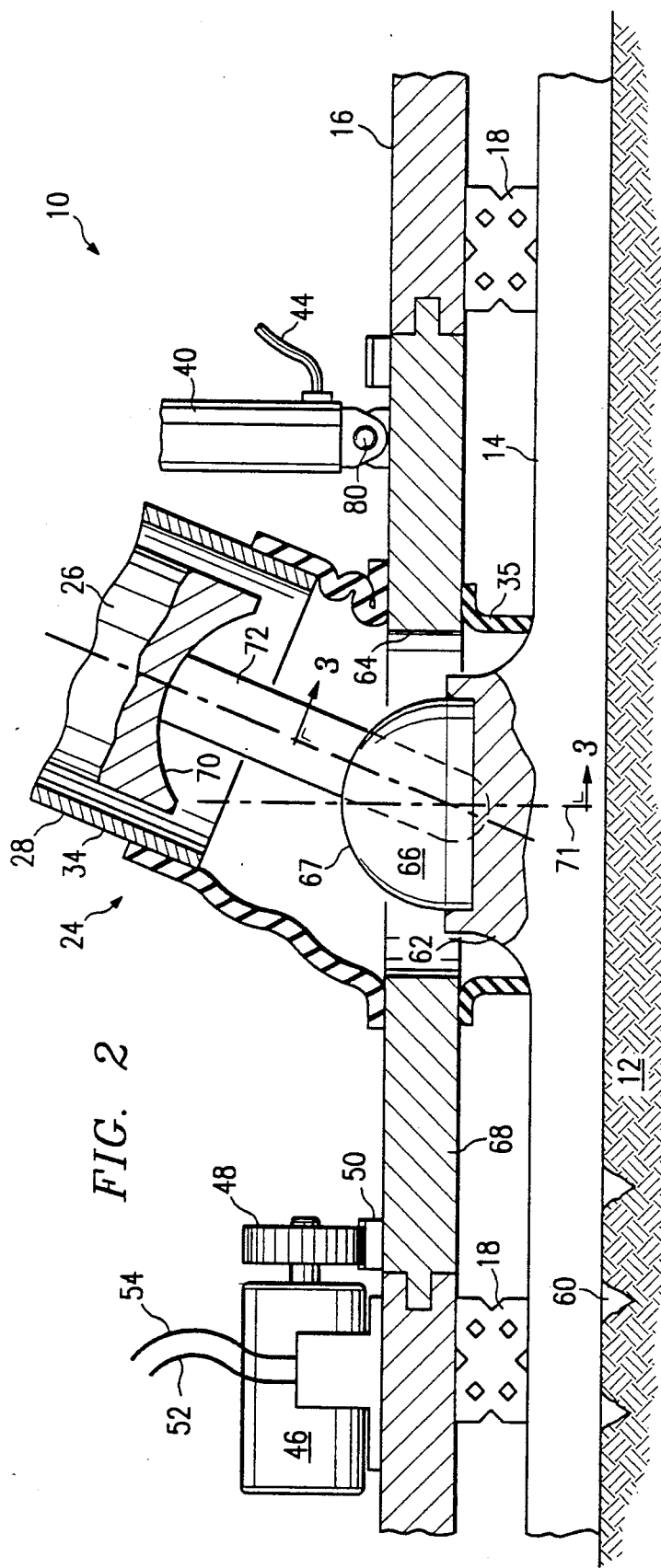
FIG. 2 is an enlarged fragmentary view of the apparatus of FIG. 1, partly in cross-section, illustrating apparatus for orienting the seismic generator and for sealing the housing to prevent the entrance of water into the housing when the apparatus is used in an underwater environment.
Figure 3:
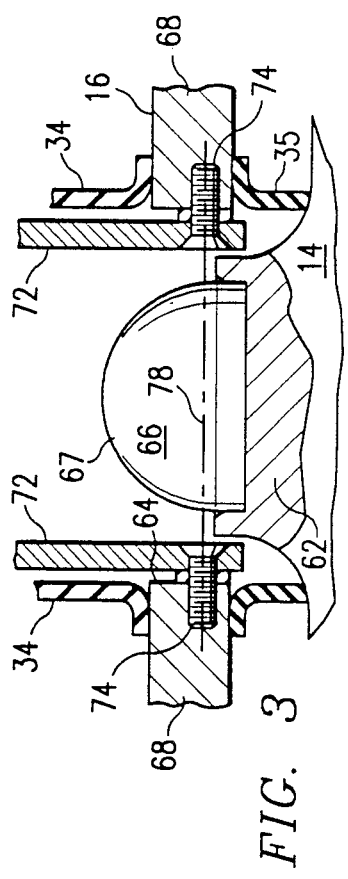
FIG. 3 is a fragmentary, cross-sectional view taken generally along the line 3—3 of FIG. 2.

FIGS. 2 and 3 illustrate, in more detail, the structure of the base plate 14, lift frame 16, and of the connection between the generator 24 and the lift frame 16. As shown therein, the base plate 14 is provided with projections 60 that extend from the bottom side thereof into intimate engagement with the surface 12. The upper portion of the base plate 14 is provided with a projection 62 that extends upwardly into an opening 64 formed in the lift frame 16. The projection 62 is arranged to receive an anvil member 66 which has a convex upper surface 67. Preferably, the surface 67 is a portion of a sphere.

It can be seen in FIG. 2 that the opening 64 extends through a positioning member 68 that forms a portion of the lift frame 16. The positioning member 68 is preferably circular and is moveable about a centerline 71 with respect to the lift frame 16. On its upper surface, the positioning member 68 is provided with the ring gear 50. The ring gear 50 is in engagement with the drive gear 48, which is driven by the motor 46 to cause the positioning member 68 to rotate relative to the lift frame 16 and relative to the base plate 14.

The impact mass 26 includes a concave surface 70 which faces the spherical surface 67 of the anvil member 66. Upon actuation of the impact mass 26 to drive it toward the base plate 14, the surfaces 67 and 70 come into engagement to create the seismic signal.

As previously mentioned, it is also possible to tilt the generator 24 relative to the lift frame 16 and relative to the base plate 14 so that shear waves, as well as compression waves, can be generated by the apparatus 10. The angular positioning of the generator 24 is accomplished through the flexible member 34 and through a pair of pivot arms 72 (see FIG. 3) that are rigidly attached to the lower end 32 of the housing 28.

The lower ends of the arms 72 are pivotally connected by threaded fasteners 74 to the positioning member 68. The fasteners 74 are located along a center line 78 so that the pivot axis of the apparatus 24 is disposed along a diameter of the anvil member 66 and within the thickness of the positioning member 68. It is preferred that the pivot be located as low as possible to reduce the amount of movement between the lower end 32 of the housing 28 and the positioning member 68 to the smallest amount possible. Thus, it will be possible to use the flexible member 34 which is mounted on the lower end 32 of the housing 28 and attached to the upper end of the positioning member 68 as a seal to prevent the entrance of water into the opening 64 when pressurized gas is introduced into the interior of the housing 28.

The tilting or angular positioning of the generator 24 is accomplished through the hydraulic cylinder 40 which has its lower end pivotally mounted on the positioning member 68 as indicated at 80. With the generator 24 able to pivot with respect to the base plate 14, and the rotational movement possible between the generator 24 and the base plate 14, the generator 24 can be positioned at the desired angle with respect to vertical and at the desired azimuthal position so that the seismic waves generated will be along the desired azimuth.

Figure 4:
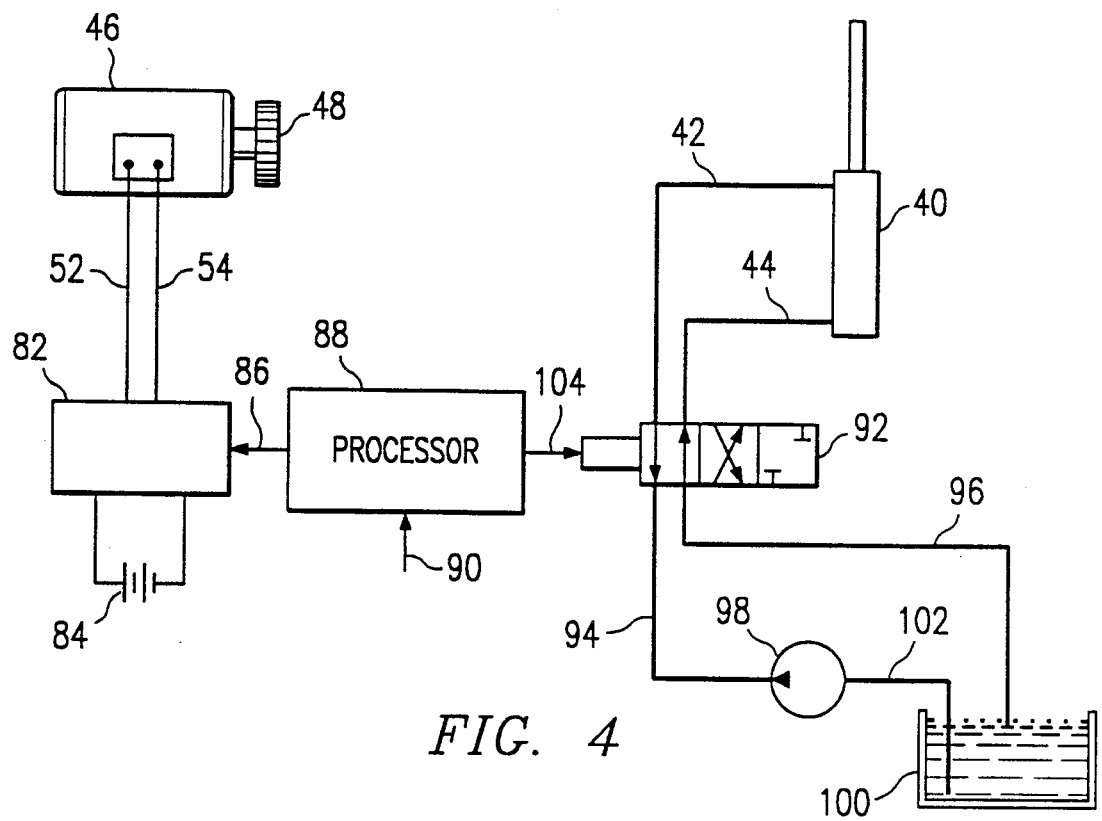
FIG. 4 is a schematic diagram illustrating a control arrangement that could be utilized with the apparatus of FIG. 1.

The control of such positioning may be accomplished by using apparatus such as that illustrated in the schematic of FIG. 4. As shown therein, the motor 46 which controls the azimuthal position of the generator 24 is connected by the conductors 52 and 54 with a stepping relay 82 or the like. The relay 82 is connected by appropriate conductors with a source of electrical energy 84. The relay 82 receives an input signal through a conductor 86 from a processor 88. The processor 88 has been supplied with an input signal 90 of the preferred azimuth for alignment of the generator 24.

To control the angle, the cylinder 40 is connected by the conduits 42 and 44 with a four-way valve 92 which is connected to a source of hydraulic fluid through conduits 94 and 96. The conduit 94 extends from the four-way valve 92 to a hydraulic pump 98 and the conduit 96 extends from the four-way valve 92 to a reservoir 100. The reservoir 100 is also connected with an inlet of the pump 98 by a conduit 102.

The four-way valve 92 receives a positioning signal through conductor 104, which is also connected with the processor 88. The processor 88 transmits a signal to the four-way valve 92 in response to the input signal 90 to set the angle of the generator 24. Manifestly, other arrangements of control system can be utilized so long as the proper angle of the generator 24 and the proper azimuth setting thereof can be attained.

OPERATION OF THE PREFERRED EMBODIMENT

With the apparatus 10 located on the subsea surface 12, air is pumped through the conduit 38 into the housing 28, displacing water that may be therein downwardly and outwardly through the connector member 34 and through the opening 64 in the positioning member 68 past the flexible member 35. Since the surface to be engaged by the impact mass 26 is located above the level of the water, no water will be present to interfere with the downward travel of the impact mass 26 and thus, full energy can be delivered to the base plate 14 to create the maximum seismic signal.

Obviously, the generator 24 could be disposed in a vertical position as illustrated in FIG. 1. In this case, the seismic signal generated will be composed of compression waves only.

It is highly desireable at times to be able to generate shear waves. To generate the shear waves, it is necessary that the generator 24 be positioned at an angle relative to the base plate 14. It is general practice to place an array of receivers (not shown) at selected positions to receive the reflected seismic signals. For these receivers to be used effectively, it is necessary that the generator 24 not only be positioned at a particular angle relative to the vertical, but also that it be positioned at a selected azimuth.

To position the generator 24 along the desired azimuth and at the proper angle, the input signal 90 is fed into the processor 88. A signal with respect to the azimuth is sent through the conductor 86 into the relay 82 and then into the positioning motor 46. Actuation of the motor 46 rotates the drive gear 48 which through the ring gear 50 rotates the positioning member 68 relative to the base plate 14 until the desired azimuth is reached.

Rotation of the positioning member 68 also carries with it the cylinder 40 which is mounted thereon. The processor 88 also generates a signal for the desired angular setting which is transmitted to the four-way valve 92, positioning the cylinder 40 properly to locate the generator 24 at the desired angle. Upon reaching the desired angle and azimuth, the generator 24 can be actuated to propel the impact mass 70 at a high rate of speed into engagement with the anvil member 66, which transmits the impact force into the base plate 14 and subsequently into the surface 12.

There has been no discussion regarding azimuthally positioning or determining the overall apparatus when used undersea. Such orientation can be accomplished using a signal generator (not shown) which transmits a signal indicative of the azimuthal orientation so that the orientation of the seismic signal generator can be referenced thereto.

If desired, the apparatus could be positioned by relatively rigid means (not shown) instead of lowering the apparatus on cable. In this instance, the azimuthal orientation will be known and can be maintained during positioning of the apparatus.

Figure 5:
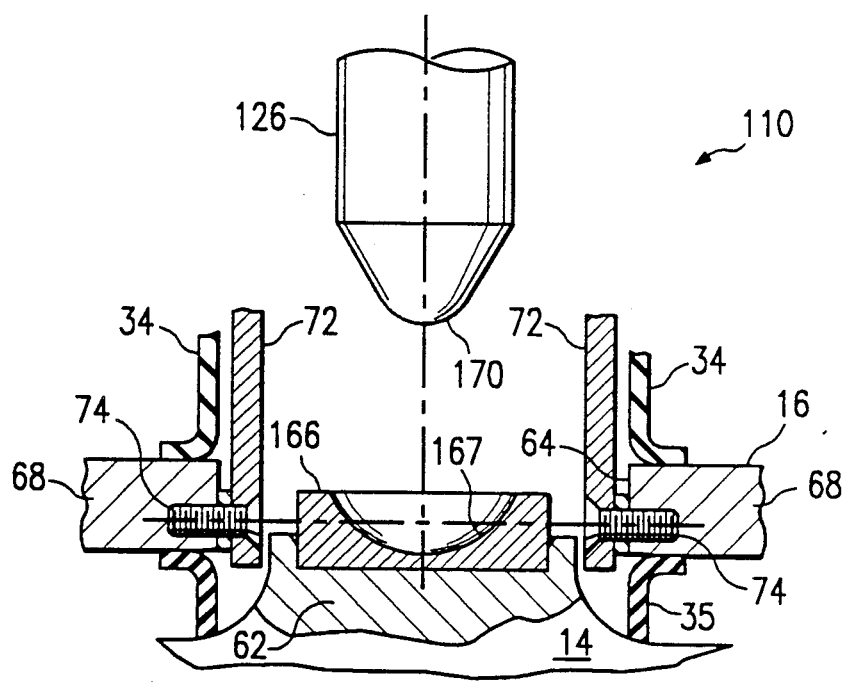
FIG. 5 is a view similar to FIG. 3 but illustrating a modification of the apparatus that is also constructed in accordance with the invention.

Modification of FIG. 5

FIG. 5 illustrates a modification of the apparatus 10 which is generally designated by the reference character 110. The same references characters will be utilized therein for parts which have not been modified as were used in the description of FIGS. 1 through 3.

As illustrated, the base plate 14 projects upwardly into the opening 64 in the positioning member 68. Instead of the convex, spherically-shaped anvil member 66 as used in FIGS. 1 through 3, a concave anvil member 166 has been substituted therefore. The anvil member 166 includes a spherical surface 167 and it is this surface that is impacted by a modified form of impact member designated by the reference character 126. Any modification to the impact member consists of forming a convex surface 170 on the surface thereof which faces the concave surface 167 and is engageable therein to impart the seismic signal into the base plate 14. Generally speaking, the fasteners 74 are located to provide a pivot axis for the pivot arm 72 which extends through a diameter of the concave surface 167 lying within the positioning member 68.

As would be expected, the apparatus 110 of FIG. 5 works precisely as did the apparatus 10 of FIGS. 1 through 4. The same control system described with respect to FIG. 4 can be used therewith. It will be noted in the FIG. 5 apparatus that the engagement between the impact mass 126 and the concave surface 127 of the anvil member 166 will be at a slightly lower point which, for the same given angular disposition of the generator 24, may cause less of a sliding moment to be imposed on the base plate 14 than will the impact between the impact mass 24, which has a concave nose and the spherical anvil member. It is believed that each will function equally well to provide the desired shear waves for use in the seismic survey.

Figure 6:
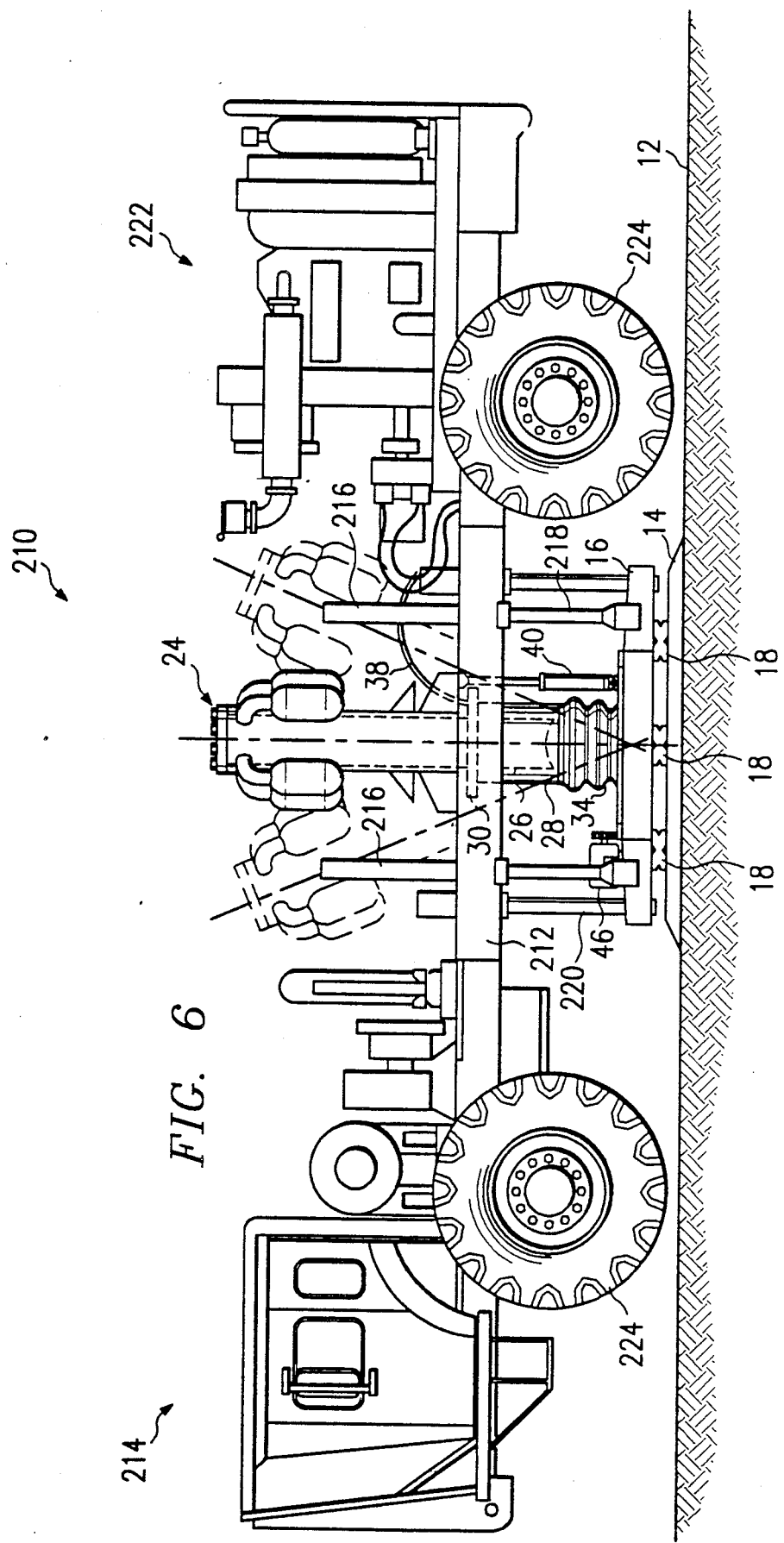
FIG. 6 is an elevation view of apparatus constructed in accordance with the invention mounted on a vehicle for use in an atmospheric environment.

Embodiment of FIG. 6

FIG. 6 illustrates the application of the apparatus 10 of FIG. 1 for use on the earth's surface in an ambient environment.

As illustrated in FIG. 6, the seismic generating apparatus generally designated by the reference character 210 is mounted on a frame 212 of a truck that is generally designated by the reference character 214. The generating apparatus 210 includes the seismic generator 24 which is mounted on lift frame 16 and includes the base plate 14.

The apparatus 210 also includes the housing 28 and the flexible connector member 34 which extends between the housing 28 and the lift frame 16. Resiliently connecting the lift frame and the base plate 16 are the vibration isolators 18.

For placing the generator 24 at an angular position, it will be noted that the cylinder 40 is mounted thereon. For positioning the generator 24 at the proper azimuth, the motor 46 is also included in the apparatus 210.

Instead of having the apparatus frame 20 with the lift cables 22, lift cylinders 216 are located on the frame 212 and have pistons 218 extending downwardly therefrom and connected with the lift frame 16. Each corner of the lift frame 16 is provided with a guide member 220.

The vehicle 214 is self-propelled with its own power plant 222 and wheels 224.

In operation, the vehicle 214 is driven to the desired location for obtaining the seismic data. The base plate 14, lift frame 16 and generator 24 are elevated above the surface 12 during the movement of the vehicle 214 into position.

Upon reaching the desired position, lift cylinders 216 are actuated, lowering the apparatus 210 downwardly with respect to the vehicle 214 until the base plate 14 is in engagement with the surface 12. Continued downward force is exerted on the lift frame 16, lifting the vehicle 214 upwardly until the wheels 224 clear the surface 12. In this position, the entire weight of vehicle 214 is exerted on the base plate 14.

When it is desired to obtain the seismic data, the cylinder 40 is actuated as described in connection with its actuation in the apparatus 10, positioning the generator 24 at the desired angle. The motor 46 is also actuated as previously described, rotating the generator 24 until it is oriented to create shock waves along a predetermined azimuth. The generator 24 is actuated to propel the impact mass 26 toward the base plate 14, creating a seismic shock wave in the earth.

Prior to actuating the generator 24 to propel the impact mass 26 at the base plate 14, pressurized air is delivered through the conduit 28 into the housing 28. The pressure of the air, being higher than ambient, prevents the entrance of dust into the apparatus and thus protects the working parts therein from contamination by the dust created when the impact occurs. The seals afforded by the members 34 and 35 aid in preventing the entrance of dust into the apparatus. Also, the presence of the housing 28 encircling the anvil 66 along with the flexible member 34 and 35 aid in reducing noise that is generated upon engagement between the impact mass 26 and the anvil 66.

From the foregoing, it will be appreciated that seismic signal generating apparatus has been described that can be used either on the surface or in a subsea location and still provide effective seismic signal generation of both compression and shear waves. In addition, such apparatus aids in preventing the entrance of dust into the apparatus, as well as reducing the noise generated by the impact.

It will also be appreciated that many changes and modifications can be made to the embodiments described hereinbefore without departing from the spirit or scope of the invention.

What is claimed is:

1. Apparatus for imparting a seismic signal into the earth, comprising:
    seismic generator means for generating a seismic signal, comprising:
        an impact mass; and
        propulsion means for driving said impact mass to produce the seismic signal;
    coupling means, in engagement with the earth and engagable with said generator means, for transferring, into the earth, signals generated by said propulsion means driving said impact mass into engagement with said coupling means;
    lift frame means located above said coupling means and resiliently connected thereto;
    hollow housing means encompassing at least a portion of said generator means for inhibiting the entrance of water into said apparatus when used in an underwater environment and for confining noise produced by said apparatus when used in an atmospheric environment, comprising:
        a first end portion connected to said generator means; and
        a second generally annular end portion, said second end portion extending toward said coupling means;
    an annular connector member flexibly connecting the second end of said housing means to said lift frame means; and
    pivot means pivotally connecting said seismic generator means to said lift frame means.

2. The apparatus of claim 1, wherein said coupling means comprises an anvil portion projecting through an opening in said lift frame means toward said housing;
    wherein said lift frame means includes a lift member and a central positioning member containing said opening that is mounted for rotation relative to said lift member and to said coupling means;
    and wherein said pivot means comprises a pivot arm rigidly connected to said seismic generator means and pivotally connected to the positioning member of said lift frame means.

3. Apparatus for imparting a seismic signal into the earth comprising:
    seismic generator means for generating a seismic signal, comprising:
        an impact mass; and
        propulsion means for driving said impact mass to produce the seismic signal;
    coupling means, in engagement with the earth and engagable with said generator means, for transferring, into the earth, signals generated by said propulsion means driving said impact mass into engagement with said coupling means;
    lift frame means located above said coupling means and resiliently connected thereto;
    hollow housing means encompassing at least a portion of said generator means for inhibiting the entrance of water into said apparatus when used in an underwater environment and for confining noise produced by said apparatus when used in an atmospheric environment, comprising:
        a first end portion connected to said generator means; and
        a second generally annular end portion, said second end portion extending toward said coupling means;
    an annular connector member flexibly connecting the second end of said housing means to said lift frame means;
    wherein said coupling means comprises an anvil portion projecting through an opening in said lift frame means toward said housing;
    wherein said lift frame includes a lift member and a central positioning member containing said opening that is mounted for rotation relative to said lift member and to said coupling means;
    and further comprising rotation means for rotating said positioning member relative to said lift member and coupling means, comprising:
        a motor and drive gear located on said lift member; and
        a ring gear located on said positioning member in mesh with said drive gear for rotating said positioning member and connected generator means to a desired azimuthal position.

4. The apparatus of claim 2 and also including rotation means for rotating said positioning member relative to said lift member and coupling means.

5. The apparatus of claim 3 and also including:
    positioning means for tilting said impact mass and housing means to selected angular positions relative to said coupling means; and
    control means for controlling said positioning means.

6. The apparatus of claim 5 wherein said positioning means includes at least one fluid-actuated cylinder connected between said housing and the positioning member of said lift means.

7. The apparatus of claim 3 and also including:
    a source of pressurized gas; and
    conduit means connecting said source of pressurized gas to the interior of said housing so that the pressure in the interior of the housing can be elevated to at least ambient pressure to prevent dust and water from entering said housing.

8. The apparatus of claim 6 and also including:
    a source of pressurized gas; and
    conduit means connecting said source of pressurized gas to the interior of said housing so that the pressure in the interior of the housing can be elevated to at least ambient pressure to prevent dust and water from entering said housing.

9. The apparatus of claim 7 and also including housing pivot means having a pivot arm rigidly connected to said housing means and pivotally connected to the positioning member of said lift means.

10. The apparatus of claim 8 and also including pivot means having a pivot arm rigidly connected to said seismic generator means and pivotally connected to the positioning member of said lift frame means.

11. Apparatus for imparting a seismic signal into the earth comprising:
    seismic generator means for generating a seismic signal, comprising:
        an impact mass; and propulsion means for driving said impact mass to produce the seismic signal;

coupling means, in engagement with the earth and engagable with said generator means, for transferring, into the earth, signals generated by said propulsion means driving said impact mass into engagement with said coupling means; and hollow housing means encompassing at least a portion of said generator means for inhibiting the entrance of water into said apparatus when used in an underwater environment and for confining noise produced by said apparatus when used in an atmospheric environment;

wherein said impact mass has a concave surface facing said coupling means;

and wherein said coupling means includes an anvil portion having a convex surface facing said impact mass and arranged for engagement therewith.

12. The apparatus of claim 11 and further comprising:
a source of pressurized gas; and
conduit means connecting said source of pressurized gas to the interior of said housing so that the pressure in the interior of the housing can be elevated to at least ambient pressure to prevent dust and water from entering said housing.

13. The apparatus of claim 1, wherein said coupling means includes an anvil portion having a convex surface facing said impact mass, said anvil portion projecting through an opening in said lift frame means toward said housing;
and wherein the pivotal connection between said pivot means and said lift frame means coincides with a diameter of a sphere including said convex surface within the plane of said lift frame.

14. The apparatus of claim 9 wherein:
said anvil portion includes a convex surface facing said impact mass; and
said housing pivot means includes at least one pivot member pivotally connecting said pivot arm to said positioning member, said pivot member being located along a diameter of a sphere including said convex surface within the plane of said lift frame.

15. The apparatus of claim 10 wherein said anvil portion includes a convex surface facing said impact mass;
and wherein said pivot means includes at least one pivot member pivotally connecting said pivot arm to said positioning member, said pivot member being located along a diameter of a sphere including said convex surface within the plane of said lift frame.

16. The apparatus of claim 1, wherein said coupling means includes an anvil portion having a concave surface facing said impact mass, said anvil portion projecting through an opening in said lift frame means toward said housing;
and wherein the pivotal connection between said pivot means and said lift frame means coincides with a diameter of a sphere including said concave surface within the plane of said lift frame.

17. An apparatus for imparting a seismic signal into the earth, comprising:
a base plate;
an anvil disposed on said base plate;
a lift frame disposed above said base plate, and having an opening therethrough to expose said anvil;
a seismic generator, comprising:
an impact mass; and
means for propelling said impact mass toward said anvil;
a support connected to said lift frame and to said seismic generator for pivoting said seismic generator at a variable angle relative to said lift frame, with the pivoting point near the location of the anvil; and
means for adjusting the angle at which the seismic generator is pivoted relative to said lift frame.

18. The apparatus of claim 17, further comprising:
a flexible housing, connected to said lift frame and to said seismic generator, and surrounding said opening through said lift frame.

19. The apparatus of claim 18, further comprising:
means for pressurizing the internal volume of said housing to a pressure greater than that outside of said housing.

20. The apparatus of claim 19, wherein said support is inside of said housing;
and wherein said adjusting means is disposed outside of said housing.

21. The apparatus of claim 17, further comprising:
a motor for rotating a portion of said lift frame;
wherein said support is connected to the rotatable portion of said lift frame.

22. The apparatus of claim 21, wherein said support comprises:
first and second support members connected to said lift frame diametrically opposite sides of said opening; and
fasteners for pivotally fastening said first and second support members to said lift frame along a pivot axis within the thickness of said lift frame.

23. The apparatus of claim 17, wherein said adjusting means comprises a hydraulic cylinder.

24. The apparatus of claim 17, wherein said anvil has a convex striking surface, and wherein said impact mass has a concave striking surface.

25. The apparatus of claim 17, wherein said anvil has a concave striking surface, and wherein said impact mass has a convex striking surface.

* * * * *